United States Patent [19]

Sakakibara

[11] Patent Number: 4,541,821
[45] Date of Patent: Sep. 17, 1985

[54] V-BELT TYPE STEPLESS TRANSMISSION

[75] Inventor: Shiro Sakakibara, Anjo, Japan

[73] Assignee: Aisin-Warner Limited, Anjo, Japan

[21] Appl. No.: 555,265

[22] Filed: Nov. 23, 1983

[30] Foreign Application Priority Data

Nov. 27, 1982 [JP] Japan .................................. 57-208144
Nov. 27, 1982 [JP] Japan .................................. 57-208147

[51] Int. Cl.[4] ............................................ F16H 11/06
[52] U.S. Cl. ........................................ 474/17; 474/11; 474/8
[58] Field of Search .......................... 474/8, 11, 28, 17

[56] References Cited

U.S. PATENT DOCUMENTS 2,623,410 12/1952 Billey ................................ 474/17 X
3,771,377 11/1973 Bush .................................... 474/17

FOREIGN PATENT DOCUMENTS 1525013 8/1965 Fed. Rep. of Germany ........ 474/17

Primary Examiner—James A. Leppink
Assistant Examiner—Frank H. McKenzie, Jr.
Attorney, Agent, or Firm—Pahl, Lorusso & Loud

[57] ABSTRACT

A V-belt type stepless transmission, basically including an input pulley and an output pulley mounted on parallel input and output shafts, respectively, each of the input and output pulleys having a stationary flange and a movable flange axially displaceable relative to the stationary flange and rotatable integrally therewith; an endless V-belt lapped around the input and output pulleys to transmit power therebetween; a servo mechanism for the movable flange, constituted by a drive member having a first screw or a second screw, the first screw formed on the movable flange or on a structure integrally connected to the movable flange, the second screw threadedly engaged with the first screw for axially displacing the movable flange by rotation of the second screw relative to the first screw, and a drive mechanism for the drive member; and a cam mechanism provided at least on one of the input and output shafts to vary compressive belt gripping force of the stationary and movable flanges in proportion to the torque transmitted by the belt.

8 Claims, 11 Drawing Figures

4,541,821

V-BELT TYPE STEPLESS TRANSMISSION

BACKGROUND OF THE INVENTION

1. Field of the Invention

This invention relates to a stepless transmission using a V-belt, and more particularly to a V-belt type stepless transmission suitable for motor vehicles.

2. Description of the Prior Art

In conventional V-belt type stepless transmissions, change gear ratios (or reduction ratio) as well as increments or decrements in compressive belt gripping force of pulleys are usually controlled by hydraulic pressure. However, since this sort of hydraulic control is restricted by the cylinder volume of a hydraulic servo and the minimum oil pressure as required in other parts of a hydraulic circuit, it has been difficult to change the belt gripping force precisely according to variations in transmitted torque. Therefore, when using as a transmission of a motor vehicle or the like which involves large variations in torque, an unduly large contact pressure is often imposed on the friction surfaces of pulleys and V-belt, shortening their service life and lowering the efficiency of power transmission.

SUMMARY OF THE INVENTION

Consequently, it is an object of the present invention to provide a V-belt type stepless transmission which is capable of precisely controlling the contact pressure between pulleys and a V-belt in proportion to transmitted torque, thereby to improve the service life of pulleys and V-belt and the power transmission efficiency.

It is another object of the present invention to provide a V-belt type stepless transmission of high reliability in safety, which can fix the gear ratio even in case a trouble should occur to a servo mechanism of a movable flange.

It is still another object of the present invention to provide a V-belt type stepless transmission for a motor vehicle, incorporating an electronic control circuit for controlling the servo mechanism of the movable flange according to operating conditions of the vehicle.

According to the present invention, there is provided a V-belt type stepless transmission which basically comprises: an input pulley and an output pulley mounted on parallel input and output shafts, respectively, each pulley having a stationary flange and a movable flange axially displaceable relative to the stationary flange and rotatable integrally therewith; an endless V-belt lapped around the input and output pulleys to transmit power therebetween; a servo mechanism for the movable flange, including a drive member having a first screw or a second screw, the first screw formed on the movable flange or on a structure integrally connected to the movable flange, the second screw threadedly engaged with the first screw for axially displacing the movable flange by rotation of the second screw relative to the first screw, and a drive mechanism for the drive member; and a cam mechanism provided at least on one of the input and output shafts to vary the belt gripping force of the stationary and movable flanges in proportion to the torque transmitted by the V-belt.

The above and other objects, features and advantages of the present invention will become apparent from the following description and appended claims, taken in conjunction with the accompanying drawings which show by way of example some illustrative embodiments of the invention.

DESCRIPTION OF THE PREFERRED EMBODIMENT

Figure 1:
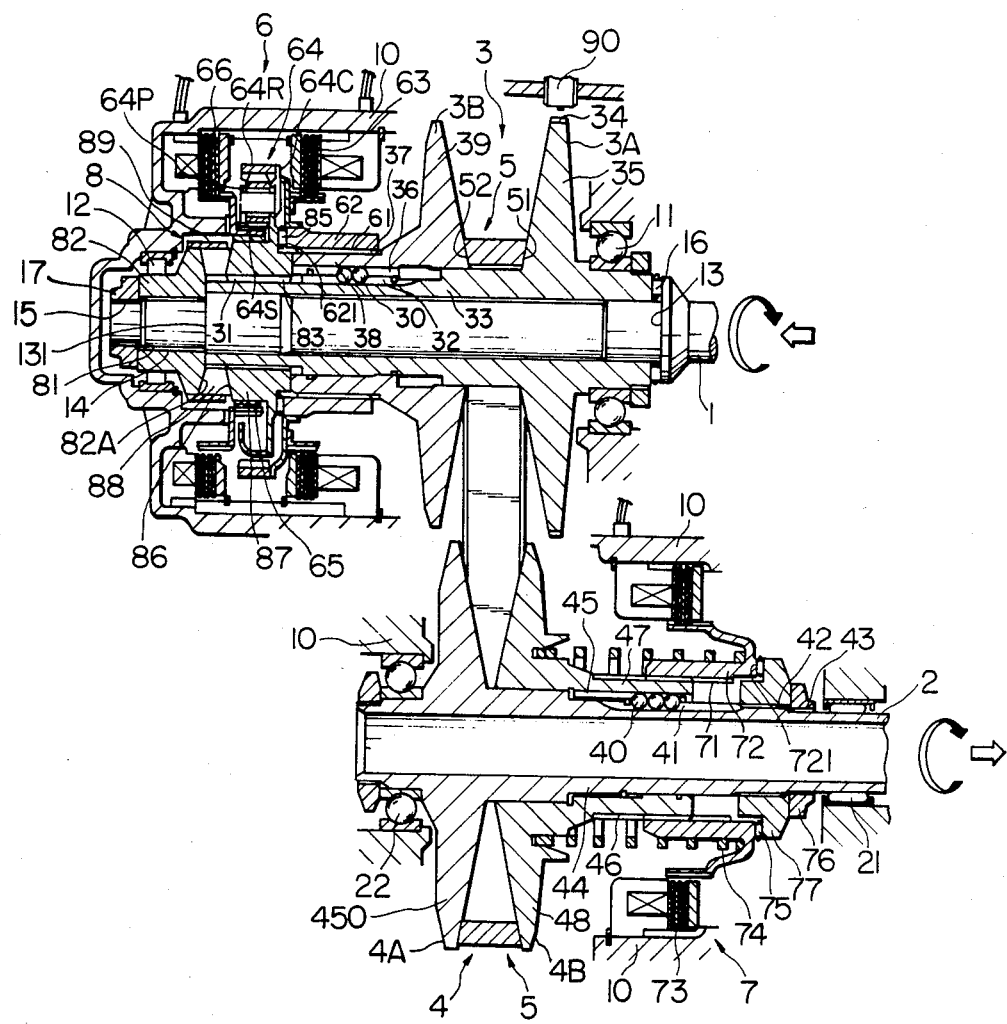
FIG. 1 is a schematic sectional view of a V-belt type stepless transmission embodying the present invention.

Referring to the accompanying drawings and first to FIG. 1, there is shown a V-belt type stepless transmission embodying the present invention, including an input shaft 1, an output shaft 2 disposed parallel with the input shaft 1, an input pulley 3 which is mounted on the input shaft 1, and output pulley 4 which is mounted on the output shaft 2, a V-belt 5 for transmitting power between the input and output pulleys 3 and 4, a servo mechanism 6 for varying the effective diameter of the input pulley 3, and a cam mechanism 8 which is provided on the input pulley 3.

The input shaft 1 is rotatably supported in a V-belt stepless transmission case 10 through bearings 11 and 12, and provided with a stepped portion 13 and a spline 14 on its circumference along with a screw 15 tapped at its fore end.

In the particular embodiment shown in FIG. 1, the output shaft 2 is rotatably supported in the transmission case 10 through bearings 21 and 22 which are formed integrally with a sleeve portion of a stationary flange which will be described below.

The input pulley 3 includes: a stationary flange 3A having a sleeve-like portion 33 which is abutted at one end (the right end in the figure) against the stepped portion 13 of the input shaft through a thurst bearing 16 and, on the circumference at the other end, provided with a spline 31 and a key way 32, and a flange portion 35 which is formed integrally with the sleeve-like portion 33 and provided with slits 34 on its outer periphery for detecting rotational speed of the input shaft; a movable flange 3B including a sleeve-like hub portion 38 axially movably fitted on the sleeve 33 of the stationary flange 3A and provided on its inner periphery with a key way 36 matching with the key way 32 on the stationary flange 3A and on its outer periphery with a first or driven screw 37, and a flange portion 39 formed integrally with the hub portion 38; a ball key 30 received in the key ways 32 and 36 to permit axial displacements of the stationary and movable flanges 3A and 3B as well as integral rotation about the axes thereof.

The output pulley 4 includes: a stationary flange 4A having a sleeve-like portion 44 which is provided on its outer periphery with a key way 41, a spline 42 and a screw 43 and formed integrally with the output shaft 2, and a flange portion 450 which is formed integrally with the sleeve-like portion 44; a movable flange 4B including a sleeve-like hub portion 47 which is axially displaceably fitted on the sleeve 44 of the stationary flange 4A are provided on its inner periphery with a key way 45 matching with the key way 41 and on its outer periphery with a first or driven screw 46, and a flange portion 48 which is formed integrally with the sleeve-like hub portion 47; and a ball key 40 received in the key ways 41 and 45 to permit integral rotation of the stationary and movable flanges 4A and 4B.

The V-belt 5 is provided with operating surfaces 51 and 52 at opposite sides thereof, providing friction surfaces to be engaged with V-shaped operating surfaces which are formed by the stationary flanges 3A and 4A and movable flanges 3B and 4B of the input and output pulleys 3 and 4.

The servo mechanism 6 of the input pulley 3 is constituted by: a sleeve 62 serving as a drive member for the movable flange 3B and provided with a second or drive screw 61 on its outer periphery for threaded engagement with the driven screw 37 of the movable flange 3B; a wet type electromagnetic multi-disc upshift brake 63 provided between the sleeve 62 and the case 10; a downshift planetary gear set 64; and a wet type electromagnetic multi-disc downshift brake 66. The planetary gear set 64 includes a ring gear 64R coupled with the sleeve 62, a carrier 64C coupled with a cam race 87 which has a spline 83 on its inner periphery in engagement with the spline 31 of the stationary flange and being abutted at one side closer to the movable flange against an end face 621 of the sleeve 62 through a thrust bearing 85, forming, at the outer side, an operating surface 86 of the cam mechanism which will be described below, a sun gear 64S rotatably supported by the cam race 87 through a bearing 65, and a planetary gear 64P meshed with the ring gear 64R and sun gear 64S and rotatably supported by the carrier 64C, and a downshift brake 66 is provided between the sun gear 64S and the case 10 thereby to control the sun gear 64S. In this instance, it is possible to switch the positions of the upshift brake 63 and the downshift brake 66 by tapping the screw threads of the drive screw 61 of the sleeve 62 and the driven screw of the movable flange 3B in an opposite direction.

The servo mechanism 7 of the output pulley is constituted by: a sleeve 72 serving as a drive member and provided with a second or drive screw 71 on its inner periphery for threaded engagement with the driven screw 46 of the movable flange 4B; a wet type electromagnetic multi-disc upshift brake 73 for fixing the sleeve 72 to the case 10; a downshift torsion coil spring 74 having the opposite ends thereof connected securely to the sleeve 72 and movable flange 4B; and a support ring 77 which is provided with a spline on the inner periphery for engagement with the spline 42 of the output shaft and having one face on the side of the movable flange 4B abutted against an end face 721 of the sleeve 72 and the other face stopped by a nut 76 for supporting the sleeve 72 in the axial direction.

Figure 2:
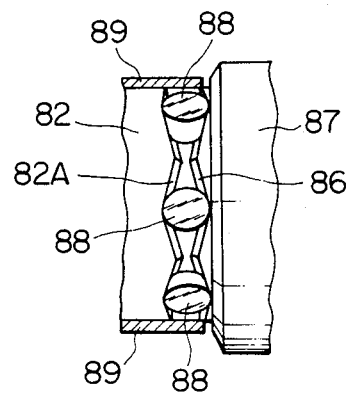
FIG. 2 is a front view of a cam mechanism.
Figure 3:
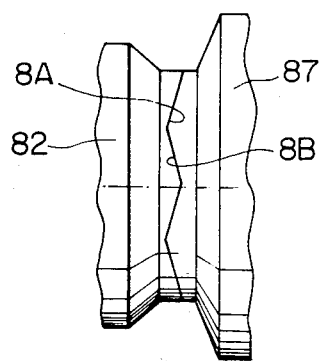
FIG. 3 is a view similar to FIG. 2 but showing another embodiment of the cam mechanism.

As shown also in FIG. 2, the cam mechanism 8 is constituted by: a cam race 82 axially fixed in position between the stepped portion 131 of the input shaft 1 and a nut 17 threaded on the screw 15 at the end of the input shaft and provided with a spline 81 on the inner periphery for engagement with the spline 14 on the input shaft; the other cam race 87; tapered rollers 88 interposed between the cam races; and a cover ring 89 for the rollers 88. The rollers 88 are held between operating surfaces 82A and 86 of the races 82 and 87 to vary the pressure which urges the movable flange 3B rightward in the drawing, in response to a displacement in the rotational direction of the input shaft 1 and stationary flange 3A. The cam mechanism may be of different types, for example, a mechanism which employs ball bearings instead of the tapered rollers 88 or a mechanism which is arranged to abut inclined surfaces 8A and 8B directly in the manner shown in FIG. 3.

The above-described V-belt type stepless transmission of the invention operates in the following manner.

Figure 4:
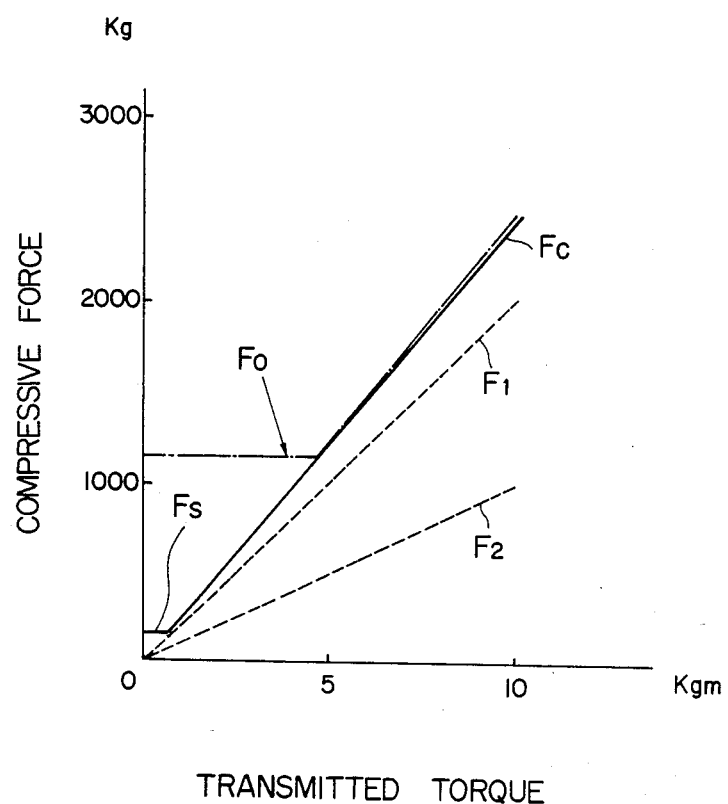
FIG. 4 is a diagram explanatory of operating principles of the cam mechanism.

(a) Brakes 63, 66 and 73 all released in normal speed operation:

The transfer of torque takes place in the following order: input shaft 1→one race 82 of cam mechanism-→tapered rollers 88→the other race 87→input pulley 3→V-belt 5→output pulley 4→output shaft 2. The torque which is transmitted by the V-belt 5 is proportional to the compressive force which is imposed on the V-belt 5 and applied to the other cam race 87 through the movable pulley 3B and the sleeve 62 which is in threaded engagement with the movable pulley 3B, slightly moving the input pulley in the rotational direction according to the principles of the cam mechanism. As a result, the compressive force Fc which is imposed by the tapered rollers in the axial direction is varied in proportion to the transmitted torque as shown in FIG. 4, and the compressive force acting on the movable flange 3B which grips the V-belt 5 is varied in proportion to the transmitted torque. Accordingly, the surface pressures on the operating surfaces of the V-belt 5 and on the operating surfaces of the movable and stationary flanges 3B and 3A are varied to change the compressive force on the abutted surfaces. In FIG. 4, the reference character F1 indicates a compressive force which is required to prevent slips of the V-belt at a highest reduction ratio, F2 indicates a compressive force which is required to prevent slips of the V-belt at a lowest reduction ratio, F0 indicates a compressive force when a conventional hydraulic servo is used, and Fs indicates a compressive force by a spring. It will be clearly seen from the graph of FIG. 4 that, in the V-belt stepless transmission of the invention using the cam mechanism 8, the compressive force is varied in proportion to the transmitted torque even when transmitted torque is lower than 5 kgm, so that it is possible to lessen generation of unnecessary compressive force at the V-belt and pulleys.

(b) Upshift by engagement of brakes 63 and 73.

The sleeves 62 and 72 are rotated relative to the sleeve portions 38 and 47 of the movable flanges, displacing the movable flange 3B in a direction of increasing the effective diameter of the input pulley 3 (rightward in the drawing) and displacing the movable flange 4B in a direction of reducing the effective diameter of the output pulley (rightward in the drawing) to lower the reduction ratio. At the point in time when the reduction ratio reaches a preset control value, the brakes 63 and 73 are released. At this time, the torsion spring 74 of the servo mechanism of the output pulley is twisted to charge energy.

(c) Downshift by engagement of brake 66.

Upon engaging the brake 66, the sun gear 64S of the planetary gear set 64 is held stationary, and the ring gear 64R increases the speed of the sleeve 62 in the rotational direction of the input shaft, displacing the movable flange 3B in a direction of reducing the effective diameter of the input pulley 3 (leftward in the drawing). The torsion spring 74 on return rotationally drives the sleeve 72, displacing the movable flange 4B in a direction of increasing the effective diameter of the output pulley 4 (leftward direction in the drawing). This displacement of the movable flange 3B of the input pulley 3 is effected against the pressing force of the cam mechanism 8 acting on the movable flange 3B. As soon as reduction ratio reaches a preset control value, the brake 66 is released.

With this V-belt type stepless transmission, when it becomes difficult to engage brakes 63, 66 and 73 due to a trouble in electromagnetic brakes, the transmission continually operates in a reduction ratio which was selected before occurrence of the trouble. Therefore, it is safe and completely free of an inadvertent change of reduction ratio as caused by leakage of oil pressure in the case of a V-belt type stepless transmission which is adapted to change the reduction ratio by a hydraulic servo.

Although a servo mechanism 6 with upshift brake 63, downshift brake 66 and planetary gear set 64 are provided only on the part of the input pulley 3 in the above-described embodiment, of course a similar servo mechanism may also be provided for the output pulley 4. The brakes may be dry friction brakes instead of the above-mentioned wet type.

Figure 5:
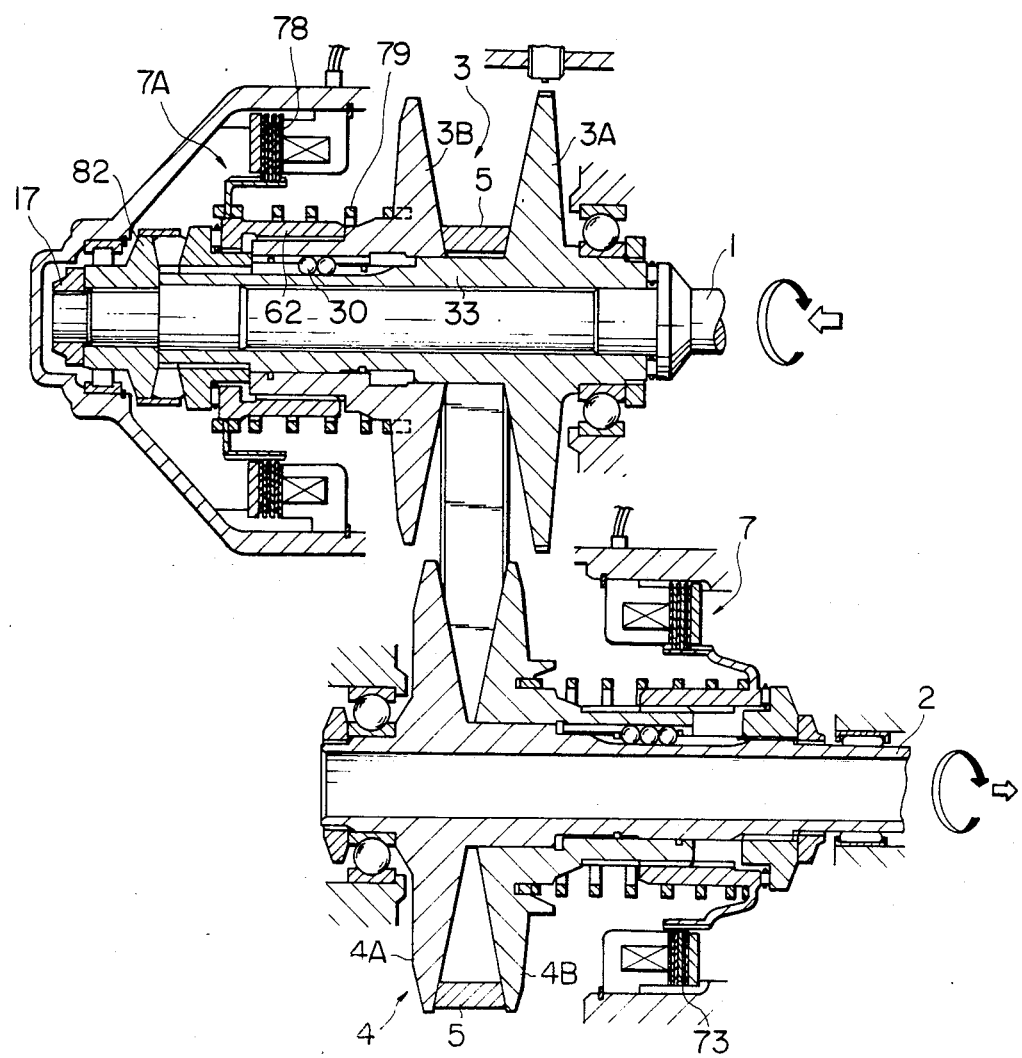
FIG. 5 is a view similar to FIG. 1 but showing a second embodiment of the V-belt stepless transmission according to the invention.

Referring to FIG. 5, there is shown a second embodiment of the present invention, which employs, as a drive mechanism for the movable flange 3B of the input pulley 3, a servo mechanism 7A similar to the servo mechanism of the movable flange 4B of the output pulley 4 in the foregoing first embodiment. The servo mechanism 7A includes a sleeve 62 serving as a drive member, a wet type electromagnetic multi-disc downshift brake 78 for holding the sleeve 62 and case 10 stationary, and an upshift torsion spring 79 having one end thereof fixed to the movable pulley 3B and the other end to the sleeve 62.

In the case of the V-belt stepless transmission of this embodiment, both of the downshift brake 78 and upshift brake 73 are released during oridinary operation, engaging only the brake 78 at the time of downshift and only the brake 73 at the time of upshift. The torsion spring 79 of the movable flange 3B of the input pulley is constantly imparted with a predetermined twist which is increased, for example, at the time of upshift and released at the time of downshift.

Figure 6:
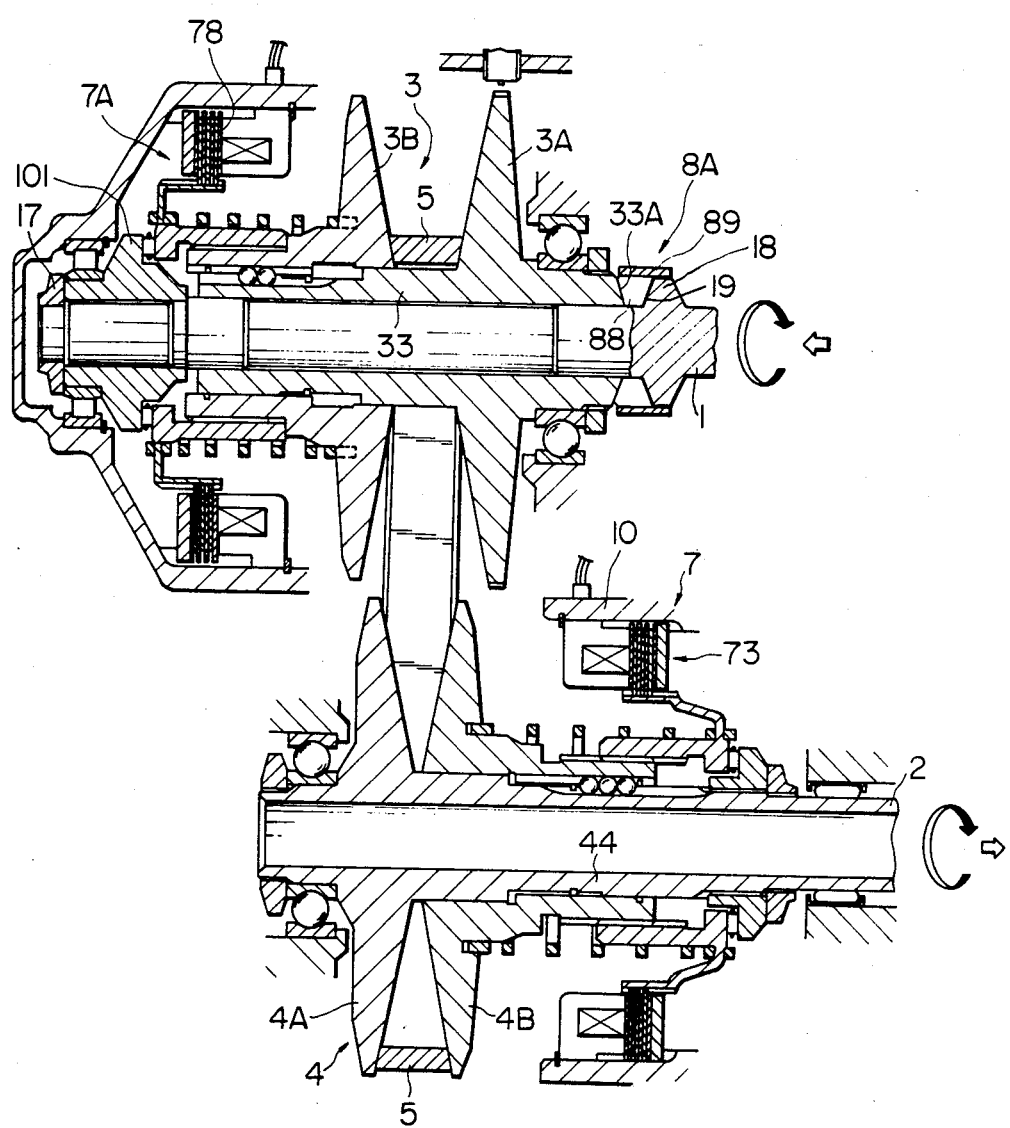
FIG. 6 is a view similar to FIG. 5 but showing a third embodiment of the V-belt stepless transmission according to the invention.

FIG. 6 illustrates a third embodiment of the invention, in which the cam mechanism 8 is located on the right side of the input pulley 3 of the input shaft 1 as seen in the drawing. The cam mechanism 8A has operating surfaces on a face 19 of a collar-like portion 18 on the side of the input pulley and an end face 33A of the sleeve 33 of the stationary flange 3A of the input pulley 3, for slightly moving the input shaft 1 in a direction away from the movable flange 3B to apply to the V-belt a compressive force corresponding to transmitted torque through a thrust bearing in cooperation with a stop ring 101 which is splined on the input shaft 1 and axially blocked by a nut 17.

Figure 7:
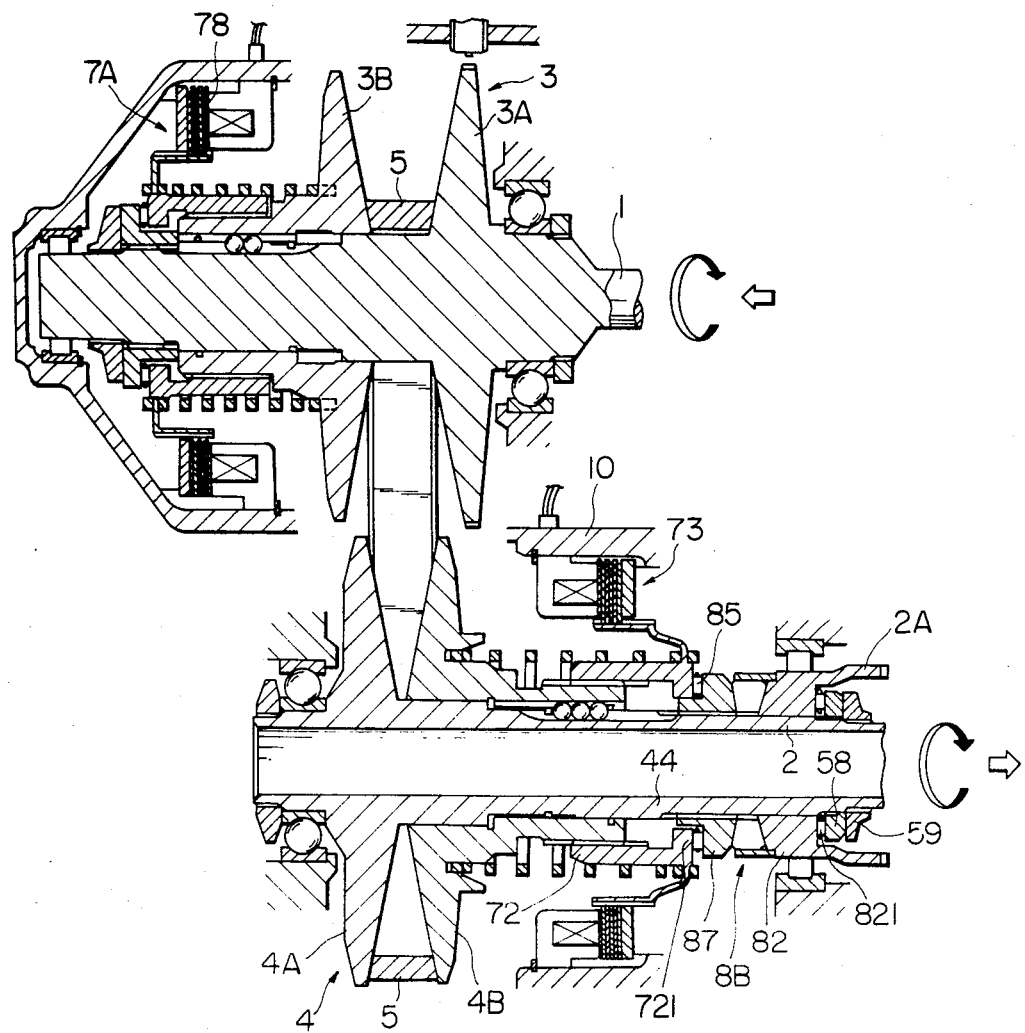
FIG. 7 is a view similar to FIG. 6 but showing a fourth embodiment of the V-belt stepless transmission according to the invention.

Referring to FIG. 7, there is shown a fourth embodiment of the invention, which has a cam mechanism 8B provided on the output shaft 2. The cam mechanism 8B is constituted by a first cam race 87 splined on a sleeve portion 44 of the stationary flange 4A of the output pulley 4 and abutted against an end face 721 of the sleeve 72 through a thrust bearing 85, a second cam race 82 fitted on the sleeve 44 and stopped in position by a nut 59 threaded on the sleeve 44, through a support ring 58 splined on the sleeve 44 and a thrust bearing 821, and tapered rollers 88. In this embodiment, a rotary drum 2A which is formed integrally with the cam race 82 functions as an output member.

Figure 8:
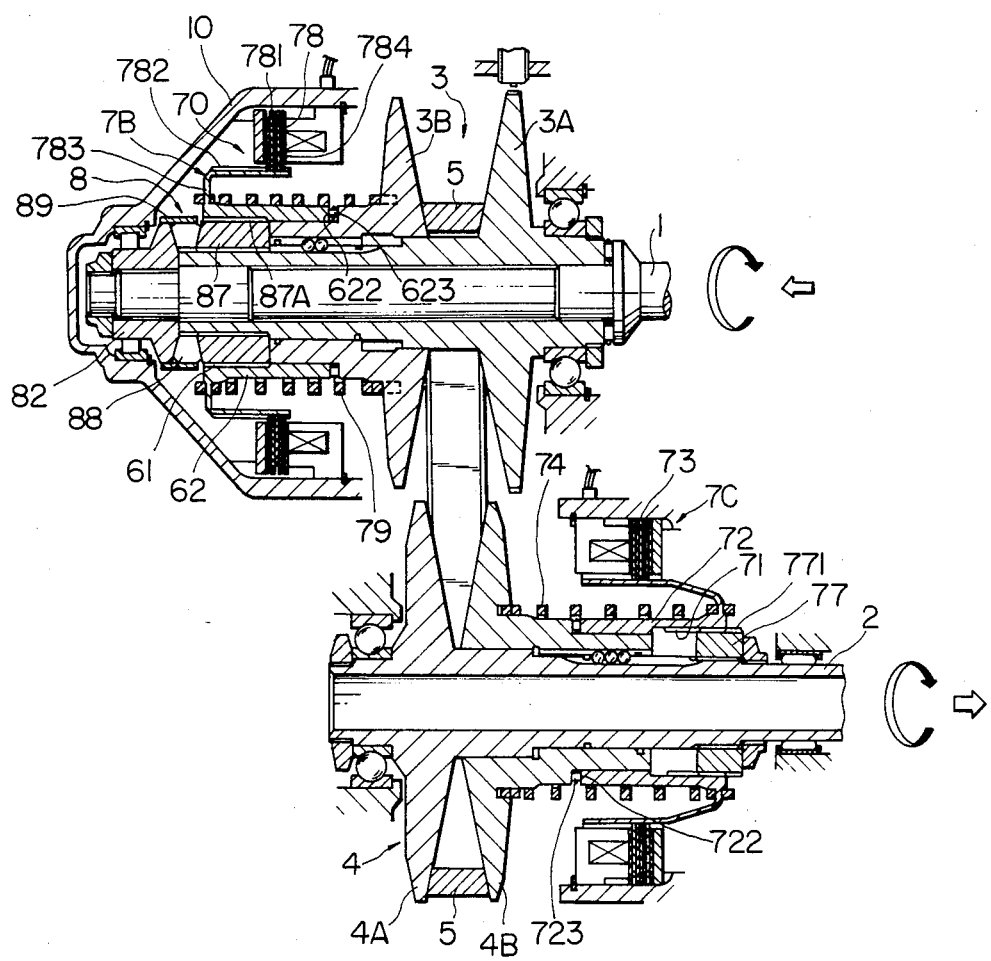
FIG. 8 is a view similar to FIG. 7 but showing a fifth embodiment of the V-belt stepless transmission according to the invention.

Referring to FIG. 8, there is shown a fifth embodiment of the invention, in which the servo mechanism 7B of the movable flange 3B of the input pulley is constituted by a downshift brake 78, an upshift torsion spring 79, a first or drive screw 87A formed on the outer periphery of the second cam race 87, a second or driven screw 61 formed on the inner periphery of the sleeve 62 and held in threaded engagement with the drive screw 87A, and a thrust bearing 623 interposed between the movable flange 3B and an end face 622 of the sleeve 62 on the side of the movable flange. A downshift brake 78 which is provided between the sleeve 62 and the transmission case 10 includes brake plates 781 with frictional engaging portions 70 splined on the case 10, a hub drum 783 coupled with the sleeve 62 and provided with a spline 782 on the outer periphery thereof, and friction plates 784 disposed between the brake plates 781 and splined on the hub drum 783, permitting axial displacement of the sleeve 62. On the other hand, the servo mechanism 7C of the movable flange 4B of the output pulley has a similar construction, and includes an upshift brake 73, a downshift spring 74, a sleeve 72 axially displaceable and having an end face 722 on the side of the movable flange 4B abutted thereagainst through a thrust bearing 723, and a support ring 77 having a first or drive screw 771 formed on the outer periphery thereof and engaged with a second driven screw 71 on the sleeve 72.

In this embodiment, when the downshift brake 78 or upshift brake 73 is engaged, the sleeve 62 or 72 which functions as a drive member is axially displaced to press the movable flange 3B or 4B.

Figure 9:
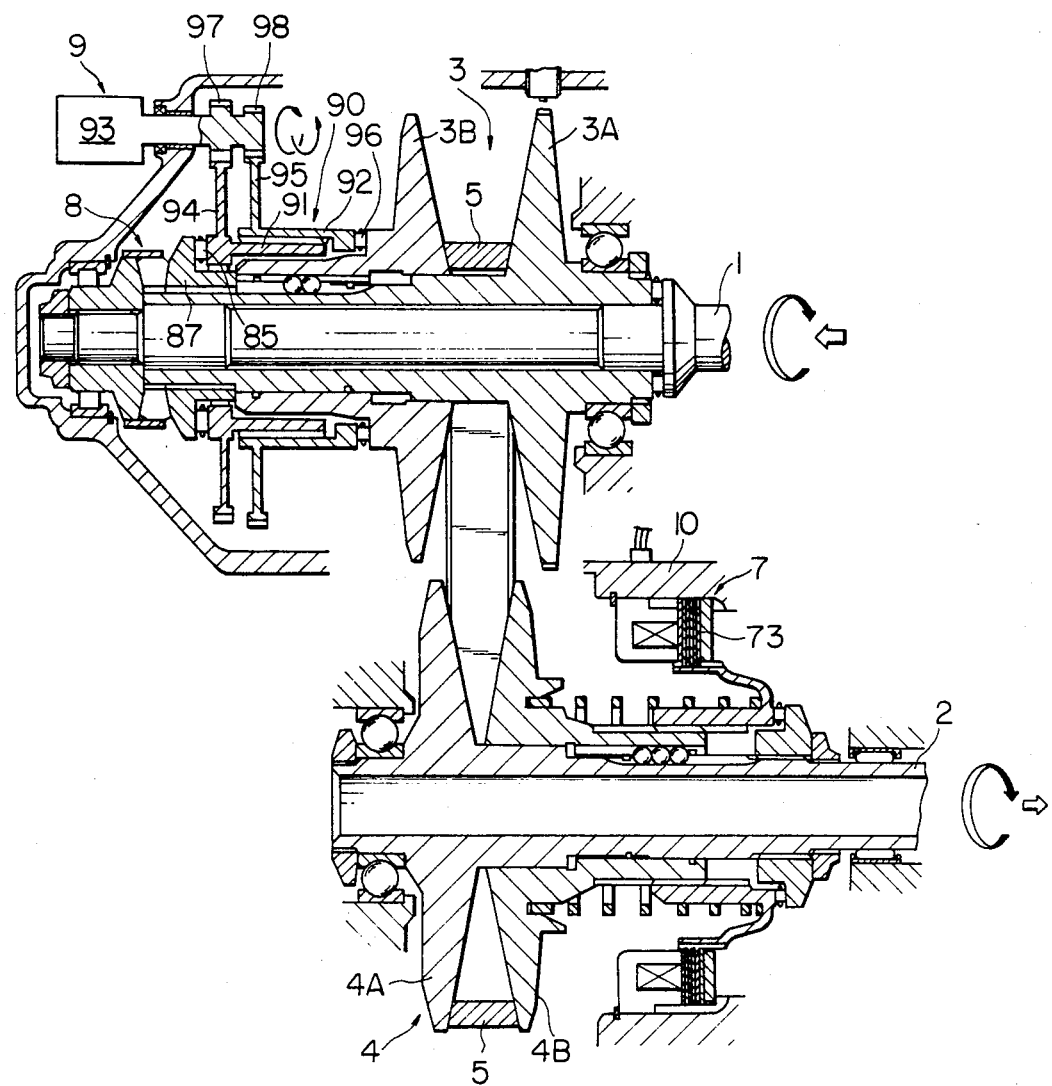
FIG. 9 is a view similar to FIG. 8 but showing a sixth embodiment of the V-belt stepless transmission according to the invention.

Referring to FIG. 9, there is shown a sixth embodiment of the invention, in which the servo mechanism 9 of the movable flange is constituted by a drive member 90 consisting of a pair of threadedly engaged sleeves 91 and 92, and a servo motor 93 for rotating the sleeve 91 and 92 relative to each other. The sleeve 91 is abutted at one end against the cam race 87 through a thrust bearing 85 and provided with a gear 94, while the sleeve 92 is abutted at one end against the movable flange 3B through a thrust bearing 96 and provided with a gear 95 at the other end. Mounted on the output shaft of the servo motor 93 are a first drive gear 97 which is meshed with the gear 94, and a second drive gear 98 which is different from the first drive gear 97 in the number of teeth and meshed with the gear 95. The axial length of the drive member 90 is varied by rotation of the motor 93, varying the pressing force of the movable flange 3B to increase or reduce the effective diameter of the input pulley 3. In this manner, it is possible to employ a drive mechanism like a servo motor for the drive member instead of a brake.

Figure 10:
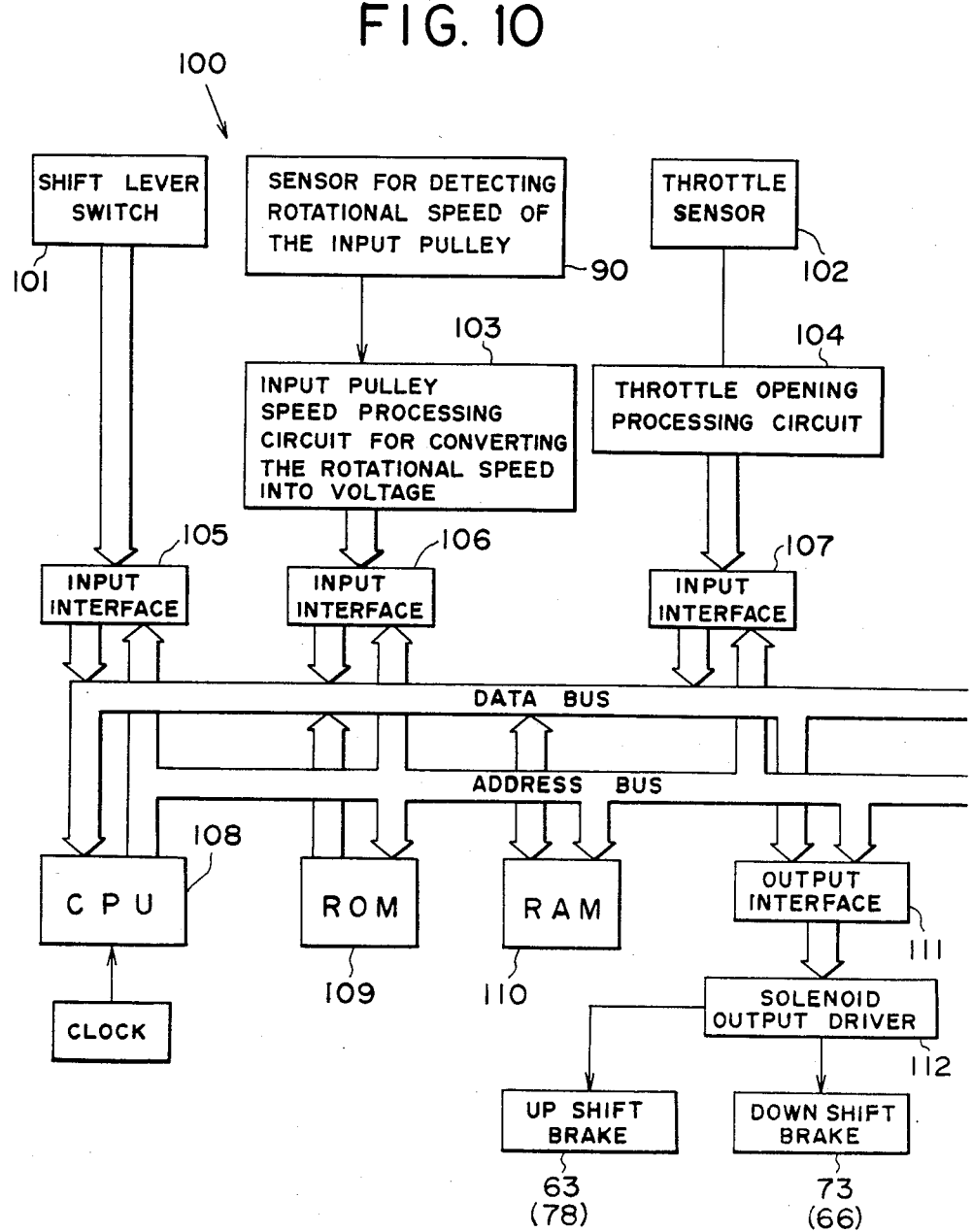
FIG. 10 is a block diagram of an electronic control circuit employed for controlling a servo mechanism of a movable flange in relation with operating conditions of a motor vehicle.

Referring now to FIG. 10, there is shown an electronic control system 100 suitable for controlling the above-described V-belt type stepless transmission when applied to a motor vehicle. In this figure, indicated at 101 is a shift lever switch for detecting the position of a shift lever which is provided near a driver's seat and shiftable into one of the positions of P (parking), R (reverse), N (neutral), D (drive) and L (low), at 90 a sensor for detecting rotational speed of the input pulley, at 102 a throttle sensor for detecting the throttle opening of the engine, at 103 is an input pulley speed processing circuit for converting the rotational speed of the input pulley into a voltage, at 104 is a throttle opening processing circuit for converting the throttle opening into a voltage, at 105 to 107 are input interfaces, at 108 is a central processing unit, at 109 is a read-only memory, at 110 is a random access memory, at 111 is an output interface, at 112 is a solenoid output driver, and at 73(66) and 63(78) are a downshift brake and an upshift brake as mentioned hereinbefore, respectively.

Figure 11:
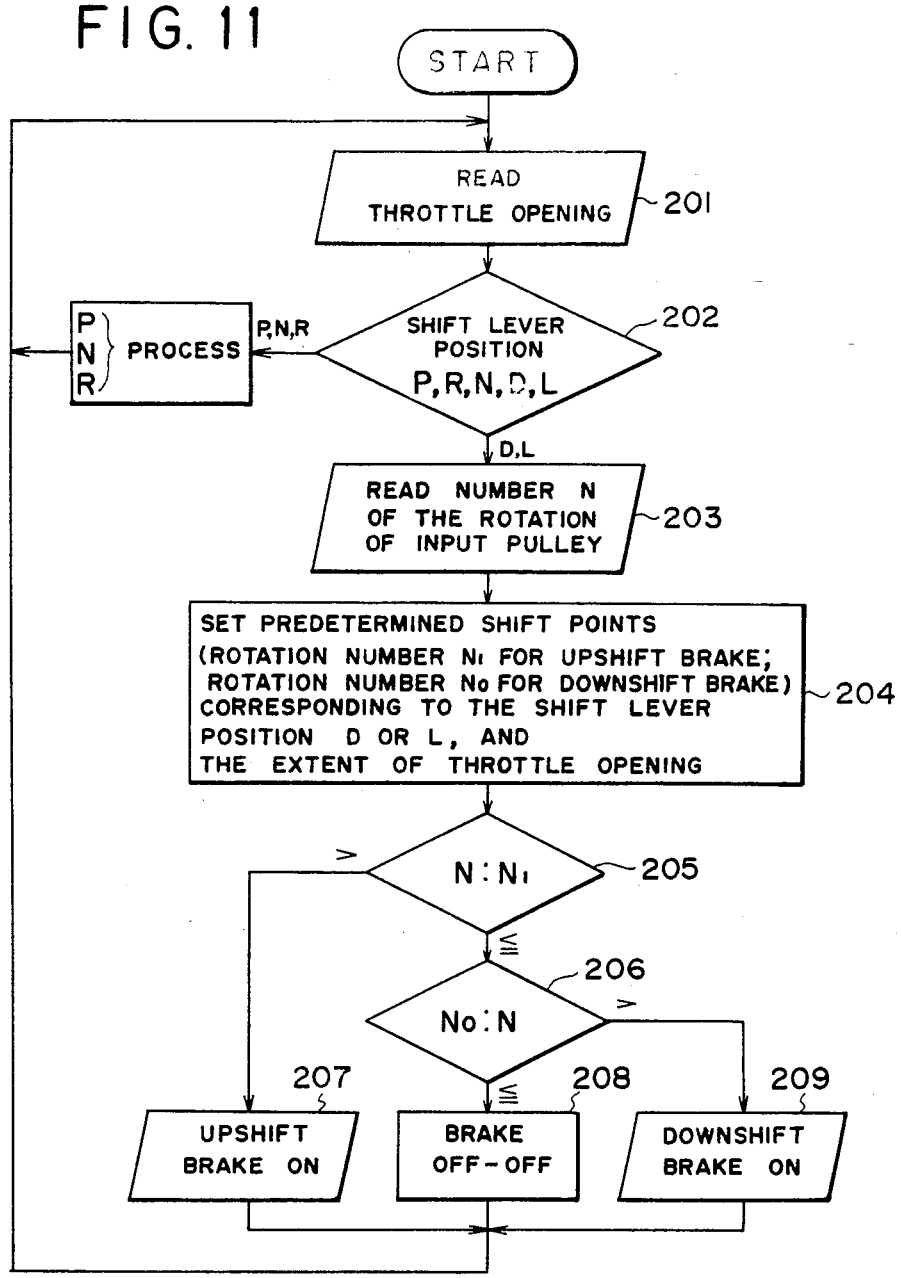
FIG. 11 is a flowchart explanatory of the operations by the electronic control circuit of FIG. 10.

In operation of the electronic control circuit 100, as shown in the flowchart of FIG. 11, the extent of throttle opening is read in through the throttle sensor 102 in the first step 201, and the shift position is discriminated by the shift lever switch 101 in the next step 202. When the shift lever is set in D- or L-position, the number of rotation N of the input pulley is read in (step 203). Then, after reading in the number of rotation N1 for upshift and the number of rotation N0 for downshift from ROM 109 which stores predetermined shift points corresponding to the shift position D or L and the extent of throttle opening (step 204), the values of N and N1 are compared (step 205). If N>N1, CPU produces an output which engages (ON) the upshift brake 63 for a predetermined time period (e.g., for 0.1 second) and the control is returned (step 207). When N≦N1, the values of N and N0 are compared in step 206, and, if N0≦N, the control circuit produces an output which maintains the two brakes in released state in step 208 and the control is returned. When N0>N, the control circuit produces an output (209) which engages (ON) the downshift brakes 73 and 66 for a predetermined time period (e.g., for 0.1 second) and the control is returned.

As is clear from the foregoing description, the V-belt type stepless transmission according to the present invention comprises: an input pulley and an output pulley mounted on parallel disposed input and output shafts, respectively, each having a stationary flange and a movable flange axially displaceable relative to and integrally rotatable with the stationary flange; a V-belt passed between the input and output pulleys; a servo mechanism provided for each movable flange and including a drive member having a first screw or a second screw, the first screw formed on the movable flange or on a structure integrally connected to the movable flange, the second screw threadedly engaged with the first screw for axially displacing the movable flange by rotation of the second screw relative to the first screw, and a drive mechanism for the drive member; and a cam mechanism provided at least one of the input and output shafts and adapted to vary the compressive belt gripping force of the stationary and movable flanges in proportion to transmitted torque. Thus, it becomes possible to improve durability of V-belt and pulleys and to enhance the efficiency of power transmission. Besides, in the event trouble should occur to the servo mechanism of a movable flange, the transmission is safely fixed in a current gear ratio.

Further, the transmission has a quick response to a shift and can quickly change the reduction ratio, so that a downshift is instantly completed upon a sudden stop of a vehicle, ensuring smooth re-start of the vehicle.

What is claimed is:

1. A V-belt type stepless transmission, comprising:
an input pulley and an output pulley mounted on parallel input and output shafts, respectively, each of said input and output pulleys having a stationary flange and a movable flange axially displaceable relative to said stationary flange and rotatable integrally therewith;
an endless V-belt lapped around said input and output pulleys to transmit power therebetween, said movable flange being adapted to press said endless V-belt against said stationary flange to create a compressive belt gripping force;
means for axially displacing said movable flanges; and
means for varying said compressive belt gripping force of said stationary and movable flanges against said V-belt in proportion to the torque transmitted by said V-belt.

2. The V-belt type stepless transmission of claim 1 wherein said means for axially displacing said movable flange comprises a servo mechanism connected to said movable flange, said servo mechanism comprising:
a drive member having a first screw or a second screw, the first screw formed on the movable flange or on a structure integrally connected to said movable flange, the second screw threadedly engaged with said first screw for axially displacing said movable flange by rotation of said second screw relative to said first screw; and
a drive mechanism for actuating said drive member.

3. The V-belt type stepless transmission of claim 1 wherein said means for varying said compressive belt gripping force comprises a cam mechanism carried on at least one of said input and output shafts.

4. The V-belt type stepless transmission of claim 2 wherein said drive mechanism comprises at least one brake for allowing or preventing rotation of said drive member.

5. The V-belt type stepless transmission of claim 2 wherein said drive mechanism comprises a servo motor adapted to rotate said drive member.

6. The V-belt type stepless transmission of claim 2 wherein said drive mechanism comprises a torsion spring adapted to rotate said drive member.

7. The V-belt type stepless transmission of claim 1 further comprising an electronic control for controlling said servo mechanism of said movable flange in relation to operating conditions of a vehicle, said operating conditions including the rotational speed of said input shaft and throttle opening.

8. The V-belt type stepless transmission of claim 1 wherein said means for axially displacing said movable flange comprises a servo mechanism connected to said movable flange, said servo mechanism including a drive member having a first screw and a second screw, the first screw formed on the movable flange or on a structure integrally connected to the movable flange, the second screw threadably engaged with said first screw for axially displacing said movable flange by rotation of said second screw relative to said first screw, and a drive mechanism for actuating said drive member; and wherein said means for varying said compressive belt gripping force comprises a cam mechanism carried by at least one of said input and output shafts.

* * * * *